(12) United States Patent
Luong et al.

(10) Patent No.: US 8,983,395 B2
(45) Date of Patent: Mar. 17, 2015

(54) METHODS AND APPARATUS FOR TESTING RADIO-FREQUENCY POWER AMPLIFIER PERFORMANCE

(75) Inventors: Anh Luong, Santa Clara, CA (US); Daniel C. Kong, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 393 days.

(21) Appl. No.: 13/323,709

(22) Filed: Dec. 12, 2011

(65) Prior Publication Data
US 2013/0149972 A1    Jun. 13, 2013

(51) Int. Cl.
*H04B 17/00* (2006.01)
*H04W 24/06* (2009.01)

(52) U.S. Cl.
CPC ........................... *H04W 24/06* (2013.01)
USPC ..................... 455/67.14; 455/67.11

(58) Field of Classification Search
CPC ..................................................... H04W 24/06
USPC ....................................................... 455/67.14
See application file for complete search history.

(56) References Cited

U.S. PATENT DOCUMENTS

| | | | |
|---|---|---|---|
| 7,155,218 | B1 | 12/2006 | Fessler et al. |
| 2004/0010384 | A1 | 1/2004 | Jacobsen et al. |
| 2007/0257680 | A1* | 11/2007 | Klijn et al. .................... 324/418 |
| 2008/0020746 | A1* | 1/2008 | Alexandar et al. ............ 455/423 |
| 2009/0192738 | A1* | 7/2009 | Nentwig .......................... 702/66 |
| 2009/0298440 | A1* | 12/2009 | Takeya et al. ............... 455/67.14 |
| 2009/0310492 | A1 | 12/2009 | Kazmi et al. |
| 2009/0316589 | A1* | 12/2009 | Shafeeu .......................... 370/252 |
| 2010/0007355 | A1* | 1/2010 | Olgaard et al. ................ 324/601 |
| 2010/0112967 | A1* | 5/2010 | Sorensen .................... 455/127.2 |
| 2010/0148745 | A1* | 6/2010 | Kanou ........................... 323/318 |

(Continued)

FOREIGN PATENT DOCUMENTS

| | | |
|---|---|---|
| CN | 101729029 | 6/2010 |
| CN | 102067656 | 5/2011 |

(Continued)

OTHER PUBLICATIONS

Lum et al., U.S. Appl. No. 13/226,367, filed Sep. 6, 2011.

(Continued)

*Primary Examiner* — Wesley Kim
*Assistant Examiner* — Devan Sandiford
(74) *Attorney, Agent, or Firm* — Treys Law Group; Jason Tsai (57) ABSTRACT

Wireless communications circuitry such as radio-frequency power amplifiers may be tested using a test station. A test station may include a test host and a test unit coupled to the test host. The power amplifiers may be configured to transmit radio-frequency signals in allocated resource blocks within a particular radio channel. The power amplifier circuits may be configured to transmit signals utilizing only an allocated portion of its total available resource blocks so that the transmitted signals are output at maximum power levels. The power amplifiers may transmit in resource blocks near a low channel edge during a first time period and may transmit in resource blocks near a high channel edge during a second time period. The test unit may receive the signals generated from the power amplifiers and may perform desired radio-frequency measurements (e.g., test unit may measure adjacent channel leakage radio, signal-to-interference ratio, error vector magnitude, etc.).

15 Claims, 10 Drawing Sheets

(56) References Cited

U.S. PATENT DOCUMENTS

| | | | |
|---|---|---|---|
| 2010/0215089 A1* | 8/2010 | Osumi | 375/224 |
| 2011/0223869 A1* | 9/2011 | Harteneck | 455/67.11 |
| 2012/0071159 A1* | 3/2012 | Akhi et al. | 455/425 |
| 2012/0088510 A1* | 4/2012 | Akhi et al. | 455/450 |
| 2012/0207030 A1* | 8/2012 | Luong | 370/245 |
| 2012/0236735 A1* | 9/2012 | Nory et al. | 370/252 |
| 2013/0049786 A1* | 2/2013 | El-Hassan et al. | 324/756.01 |
| 2013/0083834 A1* | 4/2013 | Yang et al. | 375/224 |
| 2013/0257454 A1* | 10/2013 | Mow et al. | 324/619 |
| 2014/0059397 A1* | 2/2014 | Barker et al. | 714/712 |
| 2014/0073275 A1* | 3/2014 | El-Hassan et al. | 455/115.3 |
| 2014/0087668 A1* | 3/2014 | Mow et al. | 455/67.14 |
| 2014/0162628 A1* | 6/2014 | Bevelacqua et al. | 455/423 |
| 2014/0194069 A1* | 7/2014 | Liu et al. | 455/67.14 |

FOREIGN PATENT DOCUMENTS

| | | |
|---|---|---|
| CN | 102164013 | 8/2011 |
| EP | 2182641 | 1/2004 |
| EP | 2392932 | 12/2011 |
| WO | 0209326 | 1/2002 |
| WO | 2009151361 | 12/2009 |

OTHER PUBLICATIONS

"LTE Resource Guide", Anritsu Company, 2009.
"UMTS Long Term Evolution (LTE) Technology Introduction", Rohde & Schwarz.
"SAR Test Considerations for LTE Handsets and Data Modems", Federal Communications Commission, Office of Engineering and Technology, Laboratory Division, Dec. 15, 2010.

* cited by examiner

METHODS AND APPARATUS FOR TESTING RADIO-FREQUENCY POWER AMPLIFIER PERFORMANCE

BACKGROUND

This invention relates generally to wireless communications circuitry, and more particularly, to ways for testing the performance the wireless communications circuitry.

Wireless electronic devices typically contain wireless communications circuitry that includes radio-frequency power amplifiers. Radio-frequency power amplifiers are used to amplify radio-frequency signals for wireless transmission in a desired radio-frequency channel (i.e., a radio channel). The radio-frequency performance of a device under test (DUT) can be measured using a test station. A test station typically includes a test host, a test unit that is connected to the test host, and a test cell that is connected to the test unit via a radio-frequency cable. The DUT is placed within the test cell prior to testing. Radio-frequency test signals are conveyed between the DUT and the test unit during test operations.

Conventional techniques for testing the power amplifiers involve configuring the power amplifiers to transmit radio-frequency signals at maximum output power levels across an entire radio channel. For example, consider a scenario in which a wireless DUT having a cellular telephone transceiver that is configured to operate using the Universal Mobile Telecommunications System (UMTS) network communications protocol is tested using a test station. The test host may direct the DUT to transmit radio-frequency signals at maximum output power across an entire 5 MHz channel currently being tested.

Transmitting at maximum power across the entire radio channel places the power amplifiers under an elevated stress level (i.e., transmitting at maximum power across the entire channel maximizes adjacent channel leakage) that is desirable during testing to validate design specifications or to help magnify the effects of manufacturing defects/variations (if present) associated with the radio-frequency power amplifiers in the DUT. The test unit receives the signals transmitted from the DUT and performs desired radio-frequency measurements on the received signals. The test host is used to determine whether or not the power amplifiers on the DUT satisfy performance criteria based on the gathered measurement data.

Electronic devices that communicate using newer wireless network communications technologies such as the Long Term Evolution LTE) network communications protocol have been developed. The LTE network communications protocol, however, does not allow radio-frequency signals to be transmitted at maximum output power levels across an entire channel. If conventional test methods are used, the DUT would transmit radio-frequency signals at a fixed output power level that is less than the maximum output power level across the entire channel. Testing the DUT in this way may be undesirable, because the power amplifiers are not placed under sufficiently elevated stress levels (i.e., testing the DUT while the power amplifier is transmitting at an output power level that is less than the maximum output power level does not maximize adjacent channel leakage, error vector magnitude, spurious emission, and current consumption).

It would therefore be desirable to be able to provide improved ways for testing power amplifier performance.

SUMMARY

Electronic devices may include wireless communications circuitry. The wireless communications circuitry may include storage and processing circuitry, radio-frequency input-output circuits, radio-frequency power amplifier circuitry, and other wireless circuits.

The radio-frequency input-output circuits may feed signals to the power amplifier circuitry. The power amplifier circuitry may amplify the signals prior to wireless transmission. The power amplifier circuitry may include multiple power amplifier stages. The storage and processing circuitry may control these stages to place the power amplifier circuitry in a desired power mode. For example, the power amplifier may be placed into a high power mode by enabling all of the power amplifier stages or may be placed into a low power mode by enabling one of the power amplifier stages. The power mode may also be adjusted by adjusting a bias voltage or bias current to each stage of the power amplifier.

A wireless electronic device may communicate with a base station via radio-frequency signals in a radio channel (e.g., a range of frequencies). The base station may allocate resource blocks within the radio channel to the wireless electronic device (e.g., the allocated resource blocks may represent at least a subset of all available resource blocks within the radio channel). Each resource block may correspond to a range of frequencies within the frequency channel. To communicate with the base station, the wireless electronic device may be configured to transmit radio-frequency signals in the allocated resource blocks.

The wireless electronic device may be subject to emissions requirements such as adjacent channel leakage ratio (ACLR) requirements, error vector magnitude (EVM) limitations, in-band emissions requirements, and current consumption constraints. The adjacent channel leakage ratio requirements may limit the amount of power generated by the wireless device on frequencies outside of the transmission frequency channel. The in-band emissions requirements may limit the amount of power generated by the wireless device in resource blocks within the frequency channel that are not allocated to the device.

The wireless electronic device under test (DUT) may be tested using a radio-frequency test station to measure the performance of the power amplifier circuitry. The test station may include a test host and a test unit. Radio-frequency test signals may be conveyed between the test unit and the DUT.

In one suitable arrangement, the DUT may be configured to transmit in a first subset of the available resource blocks close to a lower edge of the frequency channel so that signals transmitted near the lower edge are output at maximum output power. In another suitable arrangement, the DUT may be configured to transmit in a second subset of the available resource blocks close to a higher edge of the frequency channel so that signals transmitted near the higher edge are output at maximum output power. The number of allocated resource blocks should be less than a predetermined threshold amount such that the power amplifier circuitry is capable of transmitting signals within the allocated resource blocks at maximum output power level (e.g., the resource block utilization percentage should be less than a critical active resource block utilization threshold level, where the power amplifier circuitry will suffer from diminished output power levels if it transmits signals using a configuration exceeding the critical active resource block utilization threshold level). Transmitting signals in this way may maximize ACLR, EVM, spurious emission, and current consumption during testing, thereby improving the ability of the test station to detect any latent linearity issues with the wireless communications circuitry in the DUT.

Further features of the present invention, its nature and various advantages will be more apparent from the accompanying drawings and the following detailed description.

DETAILED DESCRIPTION

This relates generally to wireless communications, and more particularly, to ways for testing wireless communications circuitry.

Electronic devices that include wireless communications circuitry may be portable electronic devices such as laptop computers or small portable computers of the type that are sometimes referred to as ultraportables. Portable electronic devices may also be somewhat smaller devices. The wireless electronic devices may be, for example, cellular telephones, media players with wireless communications capabilities, handheld computers (also sometimes called personal digital assistants), remote controllers, global positioning system (GPS) devices, tablet computers, and handheld gaming devices. Wireless electronic devices such as these may perform multiple functions. For example, a cellular telephone may include media player functionality and may have the ability to run games, email applications, web browsing applications, and other software.

Figure 1:
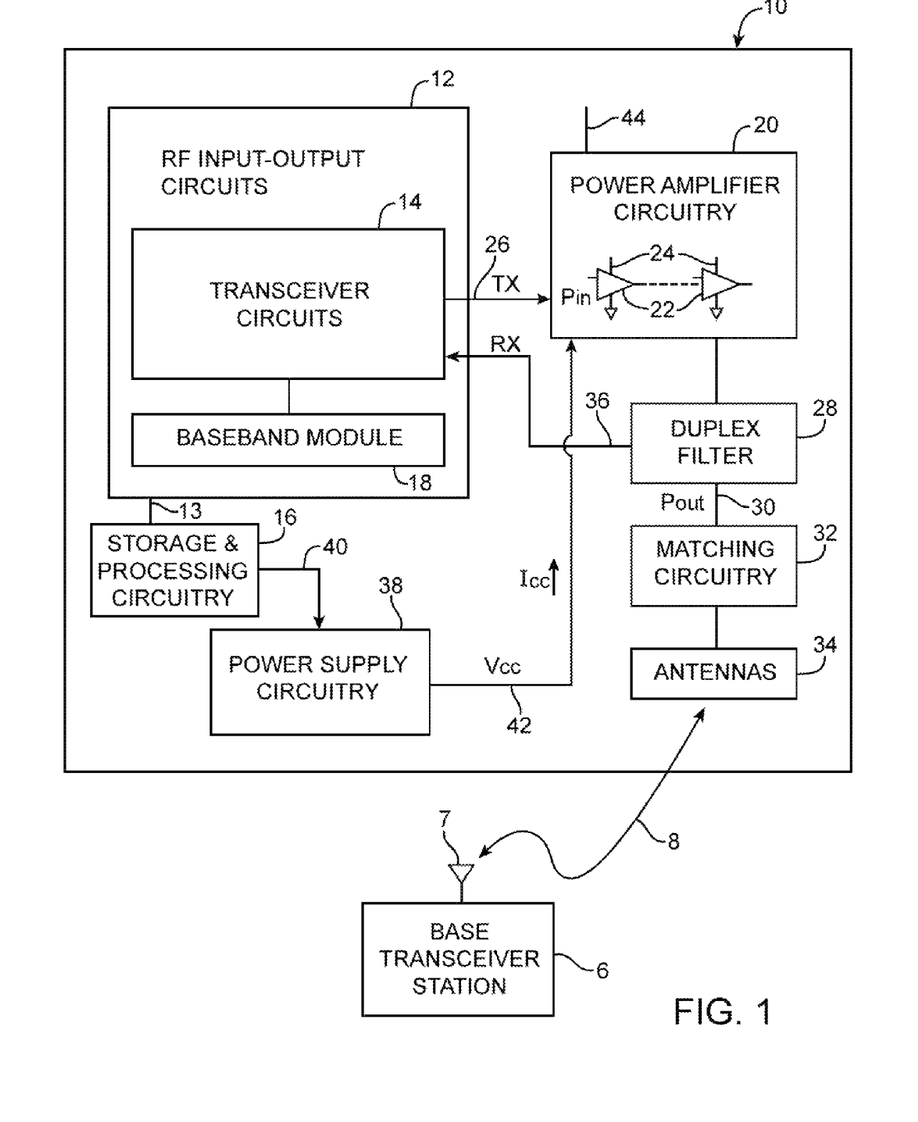
FIG. 1 is a diagram of an illustrative electronic device with wireless communications circuitry that can be used to communicate with a base station in accordance with an embodiment of the present invention.

FIG. 1 shows an illustrative electronic device that includes wireless communications circuitry. As shown in FIG. 1, device 10 may communicate with a base station 6 over a wireless communications link 8. Wireless communications link 8 may be established between base station 6 and device 10 and may serve as a data connection over which device 10 may send data to and receive data from base station 6. Communications link 8 may be established and maintained using cellular telephone network standards such as the 3GPP Long Term Evolution (LTE) protocol (as an example).

Device 10 may include one or more antennas such as antennas (antenna structures) 34 and may include radio-frequency (RF) input-output circuits 12. During signal transmission operations, circuitry 12 may supply radio-frequency signals that are transmitted by antennas 34. During signal reception operations, circuitry 12 may accept radio-frequency signals that have been received by antennas 34.

The antenna structures and wireless communications circuitry of device 10 may support communications over any suitable wireless communications bands. For example, the wireless communications circuitry may be used to cover communications frequency bands such as cellular telephone voice and data bands at 850 MHz, 900 MHz, 1800 MHz, 1900 MHz, and the communications band at 2100 MHz band, the Wi-Fi® (IEEE 802.11) bands at 2.4 GHz and 5.0 GHz (also sometimes referred to as wireless local area network or WLAN bands), the Bluetooth® band at 2.4 GHz, and the global positioning system (GPS) band at 1575 MHz. The wireless communications bands used by device 10 may include the so-called LTE (Long Term Evolution) bands. The LTE bands are numbered (e.g., 1, 2, 3, 4, etc.) and are sometimes referred to as E-UTRA operating bands.

Device 10 may be used to cover these communications bands and other suitable communications bands with proper configuration of the antenna structures in the wireless communications circuitry. Any suitable antenna structures may be used in device 10. For example, device 10 may have one antenna or may have multiple antennas. The antennas in device 10 may each be used to cover a single communications band or each antenna may cover multiple communications bands. If desired, one or more antennas may cover a single band while one or more additional antennas are each used to cover multiple bands.

Device 10 may include storage and processing circuitry such as storage and processing circuitry 16. Storage and processing circuitry 16 may include one or more different types of storage such as hard disk drive storage, nonvolatile memory (e.g., flash memory or other electrically-programmable-read-only memory), volatile memory (e.g., static or dynamic random-access-memory), etc. Storage and processing circuitry 16 may be used in controlling the operation of device 10. Processing circuitry in circuitry 16 may be based on processors such as microprocessors, microcontrollers, digital signal processors, dedicated processing circuits, power management circuits, audio and video chips, radio-frequency transceiver processing circuits, radio-frequency integrated circuits of the type that are sometimes referred to as baseband modules, and other suitable integrated circuits.

Storage and processing circuitry 16 may be used in implementing suitable communications protocols. Communications protocols that may be implemented using storage and processing circuitry 16 include internet protocols, wireless local area network protocols (e.g., IEEE 802.11 protocols—sometimes referred to as Wi-Fi®), protocols for other short-range wireless communications links such as the Bluetooth° protocol, protocols for handling 2G cellular telephone communications protocols such as GSM (Global System for Mobile Communications) and CDMA (Code Division Multiple Access), 3G cellular telephone communications protocols such as UMTS (Universal Mobile Telecommunications System) and EV-DO (Evolution-Data Optimized), 4G cellular telephone communications protocols such as LTE, etc.

Data signals that are to be transmitted by device 10 may be provided to baseband module 18. Baseband module 18 may be implemented using a single integrated circuit (e.g., a baseband processor integrated circuit) or using multiple integrated circuits.

Baseband processor 18 may receive signals to be transmitted over antenna 34 over path 13 from storage and processing circuitry 16. Baseband processor 18 may provide signals that are to be transmitted to transmitter circuitry within RF transceiver circuitry 14. The transmitter circuitry may be coupled to radio-frequency power amplifier circuitry 20 via transmit path 26. Path 13 may also carry control signals from storage and processing circuitry 16. These control signals may be used to control the power of the radio-frequency signals that the transmitter circuitry within transceiver circuitry 14 supplies to the input of power amplifiers 20 via path 26. For example, the control signals may be provided to a variable gain amplifier located inside transceiver circuits 14 that controls the power of the radio-frequency signals supplied to the input of power amplifiers 20. This transmitted radio-frequency signal power level is sometimes referred to herein as Pin, because it represents the input power to power amplifier circuitry 20.

During data transmission, power amplifier circuitry 20 may boost the output power of transmitted signals to a sufficiently high level to ensure adequate signal transmission. Circuitry 28 may contain a radio-frequency duplexer and other radio-frequency output stage circuitry such as radio-frequency switches and passive elements. Switches may, if desired, be used to switch the wireless circuitry between a transmitting mode and a receiving mode. Duplex filter 28 (sometimes referred to as a duplexer) may be used to route input and output signals based on their frequency.

Matching circuitry 32 may include a network of passive components such as resistors, inductors, and capacitors and ensures that antenna structures 34 are impedance matched to the rest of the wireless circuitry. Wireless signals that are received by antenna structures 34 may be passed to receiver circuitry in transceiver circuitry 14 over a receive path such as path 36.

Each radio-frequency power amplifier (e.g., each power amplifier in power amplifier circuitry 20) may include one or more power amplifier stages such as stages 22. As an example, each power amplifier may be used to handle a separate communications band and each such power amplifier may have three series-connected power amplifier stages 22. Stages 22 may have power supply terminals such as terminals 24 that receive bias voltages. Bias supply voltage may be supplied to terminals 24 using path 42. Control signals from storage and processing circuitry 16 may be used to selectively enable and disable stages 22 or to control the gain of individual stages using control path 44.

By enabling and disabling stages 22 selectively and/or adjusting the gain of individual stages separately, the power amplifier may be placed into different power modes. For example, the power amplifier may be placed into a high power mode by enabling all three of power amplifier stages 22 or may be placed into a low power mode by enabling two of the power amplifier stages. Other configurations may be used if desired. For example, a very low power mode may be supported by turning on only one of three gain stages or arrangements with more than three power mode settings may be provided by selectively enabling other combinations of gain stages (e.g., in power amplifiers with three or more than three gain stages). As another example, the power amplifier may be placed into a high power mode by increasing bias currents provided to one or more of the stages to increase the gain and/or maximum power output of the power amplifier (e.g., control signals may be provided via path 44 to power amplifier circuitry 20 that adjust bias currents provided to amplifiers 22). By adjusting the power mode of the amplifier, the output power capabilities of power amplifier circuitry 20 may be adjusted to maximize efficiency (e.g., for a given desired output power).

Device 10 may include adjustable power supply circuitry such as power supply circuitry 38. Adjustable power supply circuitry 38 may be controlled by control signals received over control path 40. The control signals may be provided to adjustable power supply circuitry 38 from storage and processing circuitry 16 or any other suitable control circuitry (e.g., circuitry implemented in baseband module 18, circuitry in transceiver circuits 14, etc.).

Storage and processing circuitry 16 may maintain a table of control settings or other stored information to be used in controlling power supply circuitry 38. The table may include a list of bias voltages (Vcc values) that are to be supplied by adjustable power supply circuitry 38. Based on the known operating conditions of circuitry 20 such as its current gain settings (e.g., a high power mode or a low power mode), the desired output power value Pout to be produced by power amplifier circuitry 20 (e.g., the output power from amplifier circuitry 20 as measured at output 30 of duplex filter 28), the desired transmit frequency, resource block allocation (e.g., how many resource blocks are allocated to the device and/or the locations of the resource blocks within a frequency channel), and based on the values of the control settings in the table, storage and processing circuitry 16 may generate appropriate control signals on path 40 (e.g., analog control voltages or digital control signals).

The control signals that are supplied by circuitry 16 on path 40 may be used to adjust the magnitude of the positive power supply voltage Vcc (sometimes referred to as the amplifier bias) that is provided to power amplifier circuitry 20 over path 42. These power supply voltage adjustments may be made during testing and during normal operation of device 10.

Figure 2:
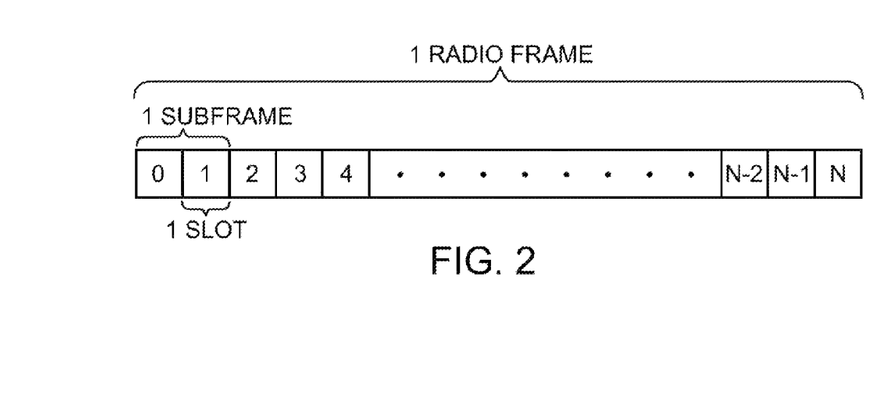
FIG. 2 is a diagram of an illustrative radio frame in accordance with an embodiment of the present invention.

Radio-frequency signals transmitted by the wireless communications circuitry of device 10 operating in accordance with the LTE protocol may, for example, be organized into a radio frame structure that is illustrated in FIG. 2. As shown in FIG. 2, a radio frame may be partitioned into subframes, each of which can be divided into two time slots (e.g., each radio frame may include N time slots). As an example, the radio frame may include ten subframes, each of which includes two 0.5 ms time slots, totaling 20 time slots or 10 ms per radio frame. In general, each radio frame may include any number of subframes, each of which may include any suitable number of time slots having any desired duration.

Figure 3:
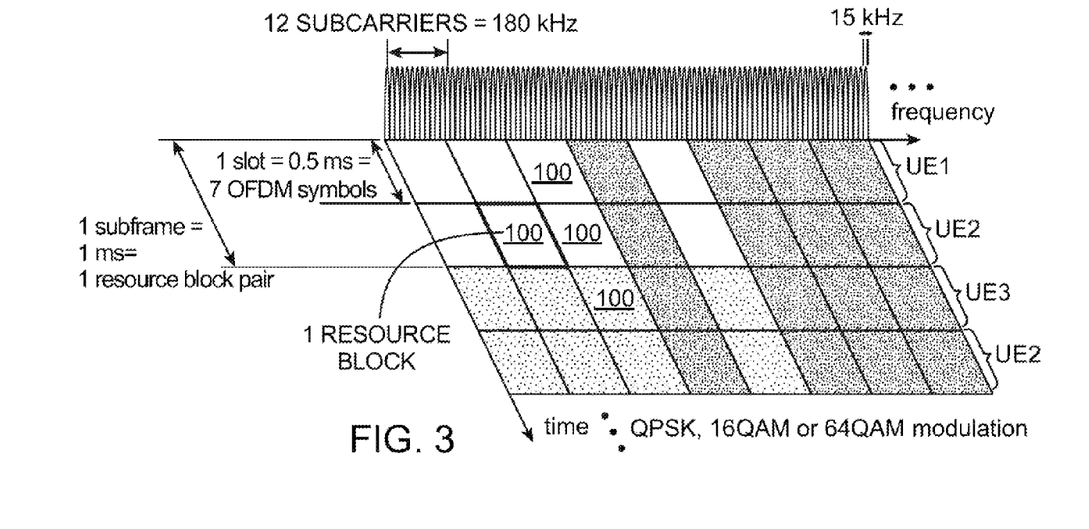
FIG. 3 is a diagram illustrating the Orthogonal Frequency-Division Multiplexing (OFDM) scheme in accordance with an embodiment of the present invention.

LTE uses an Orthogonal Frequency-Division Multiplexing (OFDM) digital modulation scheme for downlink and Single-Carrier Frequency Division Multiple Access (SC-FDMA) for uplink transmission. OFDM is a type of frequency-division multiplexing scheme in which a large number of closely-spaced orthogonal subcarriers are used to carry data. The data in each subcarrier may be modulated using respective digital modulation schemes such as quadrature phase shift keying (QPSK) and quadrature amplitude modulation (e.g., 16-QAM and 64-QAM). As shown in FIG. 3, a designated user may be given permission to transmit uplink signals during each time slot. For example, a first user device UE1 may transmit uplink signals to a corresponding base station during a first time period, a second user device UE2 may transmit uplink signals to the base station during a second time period, a third user device UE3 may transmit uplink signals to the base station during a third time period, etc. In another suitable arrangement, a base station may broadcast downlink signals intended for more than one user device during a given time slot (e.g., LTE may implement Orthogonal Frequency-Division Multiple Access for downlink transmission).

Multiple resource blocks 100 transmitted in parallel during each time slot. A resource block may serve as a basic scheduling unit that is defined as 7 or 6 consecutive OFDM symbols in the time domain (depending on the normal Cyclic Prefix or the extended Cyclic Prefix is currently in use) and 12 consecutive subcarriers in the frequency domain. Each resource block may, for example, measure 0.5 ms by 180 kHz (i.e., assuming a subcarrier spacing of 15 kHz).

Figure 4:
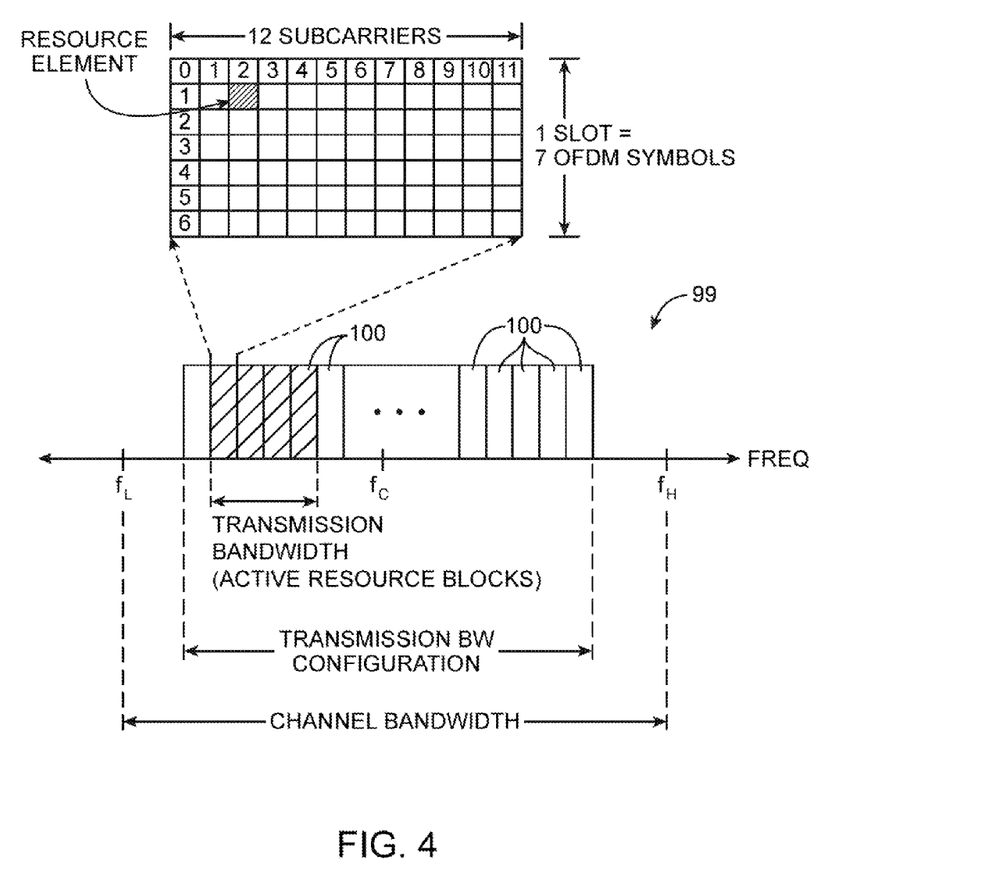
FIG. 4 is a diagram of an illustrative radio-frequency channel that is partitioned into resource blocks in accordance with an embodiment of the present invention.

Different LTE bands may include a different number of channels. Radio channels associated with different LTE bands may have respective channel bandwidths. FIG. 4 shows an illustrative channel 99 centered about frequency $f_C$. Channel 99 may have a lower channel edge bounded by $f_L$ and a upper channel edge defined by $f_H$ (e.g., channel 99 may have a channel bandwidth equal to $f_H$ minus $f_L$, where $f_C$ is equal to half of the sum of $f_H$ and $f_L$).

The maximum number of available resource blocks 100 associated with a particular channel may be defined as the transmission bandwidth configuration, which sets the maximum available (or occupied) bandwidth. The maximum available bandwidth may be computed by multiplying the transmission bandwidth configuration by 180 kHz (since each resource block has a bandwidth of 180 kHz). The available bandwidth is, by definition, less than or equal to the channel bandwidth. Generally, the number of resource blocks 100 making up the available bandwidth increases as channel bandwidth increases.

As an example, a first LTE channel may have a channel bandwidth of 10 MHz, a transmission bandwidth configuration of 50, and a maximum available bandwidth of 9 MHz (50*180 kHz). As another example, a second LTE channel may have a channel bandwidth of 5 MHz, a transmission bandwidth configuration of 25, and a maximum available bandwidth of 4.5 MHz (25*180 kHz). As another example, a third LTE channel may have a channel bandwidth of 3 MHz, a transmission bandwidth of 15, and a maximum available bandwidth of 2.7 MHz (15*180 kHz). In general, channel 99 may have any suitable channel bandwidth, a maximum available bandwidth that is less than or equal to the channel bandwidth and that is an integer multiple of the bandwidth of each resource block (e.g., 180 kHz), and a transmission bandwidth that is equal to the maximum available bandwidth divided by the resource block bandwidth.

As described previously in connection with FIG. 3, each resource block 100 may be formed with 12 consecutive subcarriers, each of which is associated with 7 OFDM symbols in the time domain. The smallest modulation unit in LTE may be referred to as a resource element, which is defined as one 15 kHz subcarrier by one OFDM symbol.

Device 10 need not utilize all of its available resource blocks 100. Device 10 may be configured to transmit in only an allocated portion (subset) of its resource blocks 100. The number of active resource blocks that is allocated to device 10 may set its transmission bandwidth. The transmission bandwidth may, for example, be computed by multiplying the number of allocated (or active) resource blocks by the bandwidth of each resource block (e.g., 180 kHz). The transmission bandwidth is, by definition, less than or equal to the maximum available bandwidth (e.g., the number of active resource blocks cannot exceed the maximum number of available resource blocks). As an example, device 10 communicating in a fourth LTE channel having a channel bandwidth of 10 MHz and a transmission bandwidth configuration of 100 (e.g., a maximum available bandwidth of 18 MHz) may be configured to transmit radio-frequency signals in only 10% of its available resource blocks, only 20% of its available resource blocks, only 49% of its available resource blocks, etc.

In general, the transmission bandwidth may be assigned to any desired portion of the maximum available bandwidth (e.g., the allocated resource blocks 100 for device 10 may be positioned near $f_L$, near $f_C$, near $f_H$, or within any suitable subset of the maximum available bandwidth). In the example of FIG. 4, the four resource blocks 100 allocated to device 10 may be positioned relatively close to $f_L$.

Figure 5:
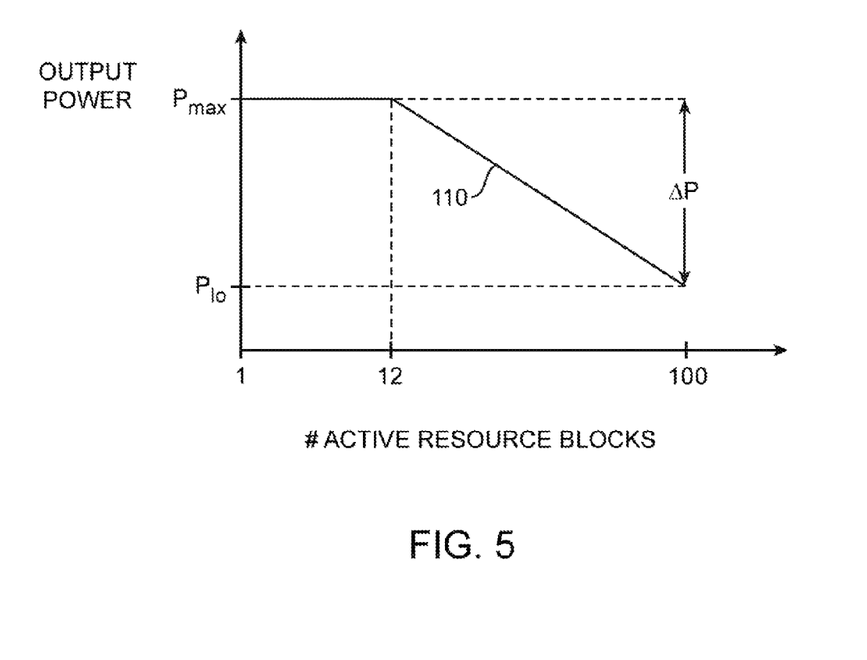
FIG. 5 is an exemplary plot of output power level versus number of active resource block allocation in accordance with an embodiment of the present invention.

FIG. 5 is an exemplary plot of output power level versus the number of active resource blocks in power amplifier circuitry 20 having a transmission bandwidth configuration of 100 (e.g., the maximum number of available resource blocks allocated in this particular channel is 100). As shown in FIG. 5, power amplifier circuitry 20 may only be capable of transmitting at its maximum output power level Pmax up to a predetermined number of allocated resource blocks.

In the example of FIG. 5, power amplifier circuitry 20 is capable of transmitting radio-frequency signals at Pmax if it utilizes 12 or fewer resource blocks. If power amplifier circuitry 20 is configured to utilize more than 12 resource blocks, its output power level will decrease as the number of active resource blocks increases (as indicated by power profile 110). If power amplifier circuitry 20 uses all of its 100 available resource blocks, the output power level of the radio-frequency signals generated by each resource block will be equal to a reduced power level of Plo. The difference between Pmax and Plo may sometimes be referred to as a power back-off ΔP. The critical active resource block utilization threshold level of 12% (12 divided by 100) at which power amplifier circuitry 20 starts experiencing diminished output power levels is merely illustrative. If desired, the critical active resource block utilization threshold level may be equal to 10%, 20%, 45%, or any suitable subset of the transmission bandwidth configuration.

Figure 6:
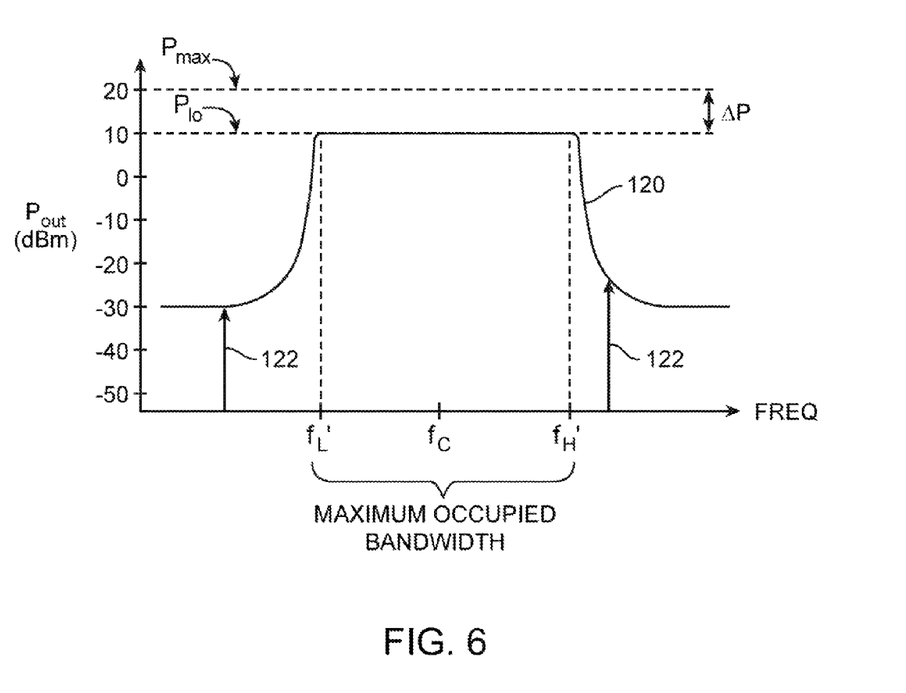
FIG. 6 is an exemplary plot of output power level versus frequency associated with power amplifier circuitry transmitting at a diminished power level in all available resource blocks in a radio channel in accordance with an embodiment of the present invention.

FIG. 6 is an exemplary plot of power amplifier circuitry 20 transmitting using its maximum number of available resource blocks. As indicated by power profile 120, the output power level is reduced to Plo from $f_L'$ (e.g., the lower edge of the maximum available bandwidth) to $f_H'$ (e.g., the upper edge of the maximum available bandwidth). Edge $f_L'$ may generally be at least greater than $f_L$ in frequency, whereas edge $f_H'$ may generally be at most equal to $f_H$ (as discussed previously, the maximum available bandwidth delineated by $f_L'$ and $f_H'$ is, by definition, less than or equal to the channel bandwidth delineated by $f_L$, and $f_H$).

The data rate at which device 10 may communicate with a base station may depend on the number of resource blocks that have been allocated to device 10 (e.g., the transmission bandwidth allocated to device 10). Device 10 may be expected to transmit radio-frequency signals only in resource blocks that have been allocated to the device. However, power amplifier circuitry 20 may undesirably produce radio-frequency signals on frequencies that have not been allocated to power amplifier circuitry 20. For example, the output signal of power amplifier circuitry 20 may include intermodulation components at frequencies outside of the transmission frequency range (e.g., outside of the allocated resource blocks). The wireless emissions produced at frequencies outside of the transmission frequency range may sometimes be referred to as spectral regrowth (or adjacent channel leakage). The amount of wireless emissions produced at frequencies outside of the transmission frequency range may depend on the linearity of power amplifier circuitry 20 (e.g., how linearly power amplifier circuitry 20 amplifies input signals).

As shown in FIG. 6, the adjacent channel leakage levels 122 are low in comparison to the average in-channel power (e.g., adjacent channel leakage levels are 30 to 40 dBm lower than Ploy. In general, it may be desirable to maximize adjacent channel leakage levels (i.e., to maximize adjacent channel leakage ratio) when testing device 10. Adjacent channel leakage ratio (ACLR) may, for example, be defined as the ratio of out-of-channel power (e.g., an output power level of signals at frequencies outside of the desired radio channel) to in-channel power (e.g., an output power level of signals within the desired radio channel).

The adjacent channel leakage ratio may be expressed in terms of decibels relative to carrier (in-channel) signals (dBc). The adjacent channel leakage ratio expressed using dBc may be calculated by subtracting the in-channel power (in terms of dBm) from the out-of-channel power (in terms of dBm). For example, consider the example in FIG. 6 in which the out-of-channel power level is −30 dBm and the in-channel carrier power level is 10 dBm. The adjacent channel leakage ratio is therefore equal to −40 dBc (−30 minus 10).

It may be desirable to have good out-of-channel rejection (i.e., a small adjacent channel leakage ratio) during normal operation of power amplifier circuitry 20. During testing, however, it may be desirable to place power amplifier circuitry 20 under elevated stress levels by maximizing ACLR and adjacent channel leakage signal magnitudes so that any linearity issues associated with circuitry 20 can manifest themselves during test operations.

Figure 7:
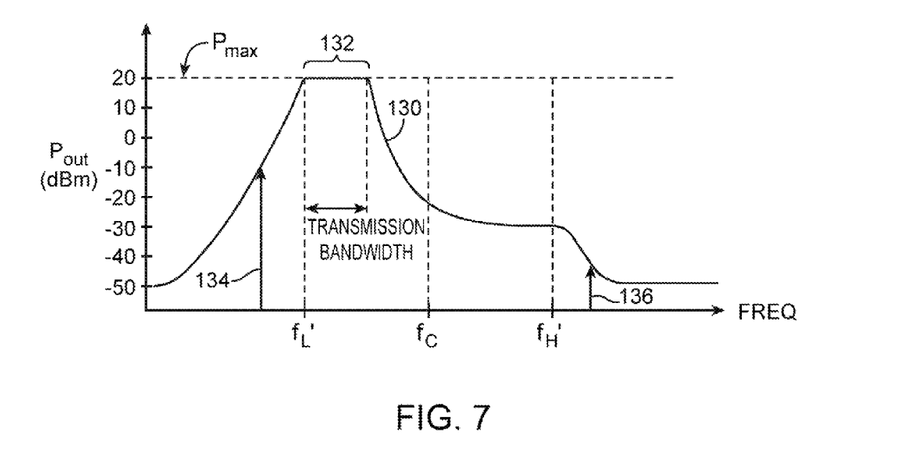
FIGS. 7 and 8 are exemplary plots of output power level versus frequency associated with power amplifier circuitry transmitting at maximum output power in desired portions of the available resource blocks in accordance with an embodiment of the present invention.

Power amplifier circuitry 20 may be configured to transmit at Pmax if only a subset of its available resource blocks 100 is in use. In one suitable embodiment of the present invention, power amplifier circuitry 20 may be configured to transmit in resource blocks 100 near lower channel edge $f_L'$ (e.g., only resource blocks responsible for transmission in frequency range 132 are allocated for device 10, as shown in FIG. 7). To obtain power profile 130 of FIG. 7, power amplifier circuitry 20 should be configured to operate below the critical active resource block utilization threshold level such that radio-frequency signals generated within transmission bandwidth 132 can still exhibit Pmax (e.g., power amplifier circuitry 20 should be configured to utilize up to a predetermined portion of its available resource blocks).

Configuring power amplifier circuitry 20 to transmit in this way may place circuitry 20 under elevated stress levels. The channel leakage near the higher channel edge may be low (see, arrow 136), but the channel leakage near the lower channel edge may be high (see, arrow 134). Such elevated adjacent channel leakage levels near lower channel edge $f_L'$ effectively pushes the power amplifier linearity performance to its limits, thus enabling a user to more effectively determine whether the wireless communications performance offered by device 10 meets design criteria.

Figure 8:
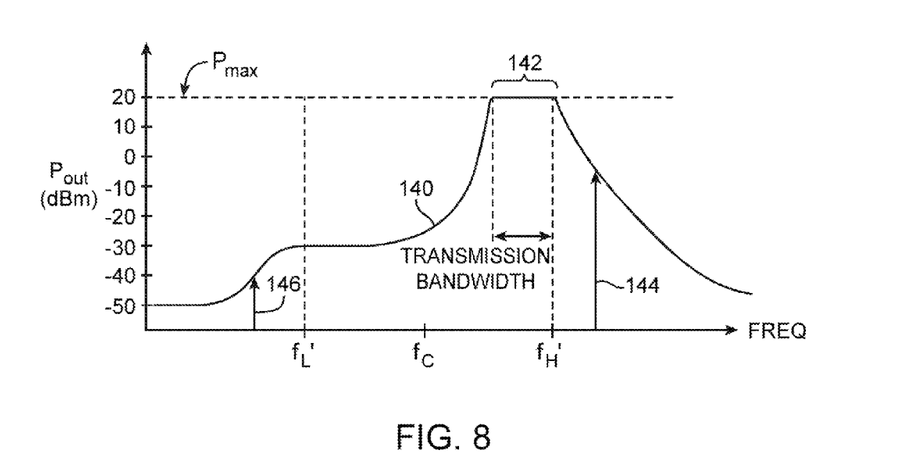

In another suitable embodiment of the present invention, power amplifier circuitry 20 may be configured to transmit in resource blocks 100 near high channel edge $f_H'$ (e.g., only resource blocks responsible for transmission in frequency range 142 are allocated for device 10, as shown in FIG. 8). To obtain power profile 140 of FIG. 8, power amplifier circuitry 20 should be configured to operate below the critical active resource block utilization threshold level such that radio-frequency signals generated within transmission bandwidth 142 can still exhibit Pmax (e.g., power amplifier circuitry 20 should be configured to utilize up to a predetermined portion of its available resource blocks).

Configuring power amplifier circuitry 20 to transmit in this way places circuitry 20 under elevated stress levels. The channel leakage near channel edge $f_L'$ may be low (see, arrow 146), but the channel leakage near channel edge $f_H'$ may be high (see, arrow 144). Such elevated adjacent channel leakage levels near high channel edge $f_H'$ effectively pushes the power amplifier linearity performance to its limits, thus enabling a user to more effectively determine whether the wireless communications performance offered by device 10 meets design criteria. The power profiles shown in FIGS. 7 and 8 are merely illustrative and do not serve to limit the scope of the present invention. If desired, power amplifier circuitry 20 may be configured to transmit at Pmax close to $f_C$ or in any suitable portion of the channel bandwidth.

Figure 9:
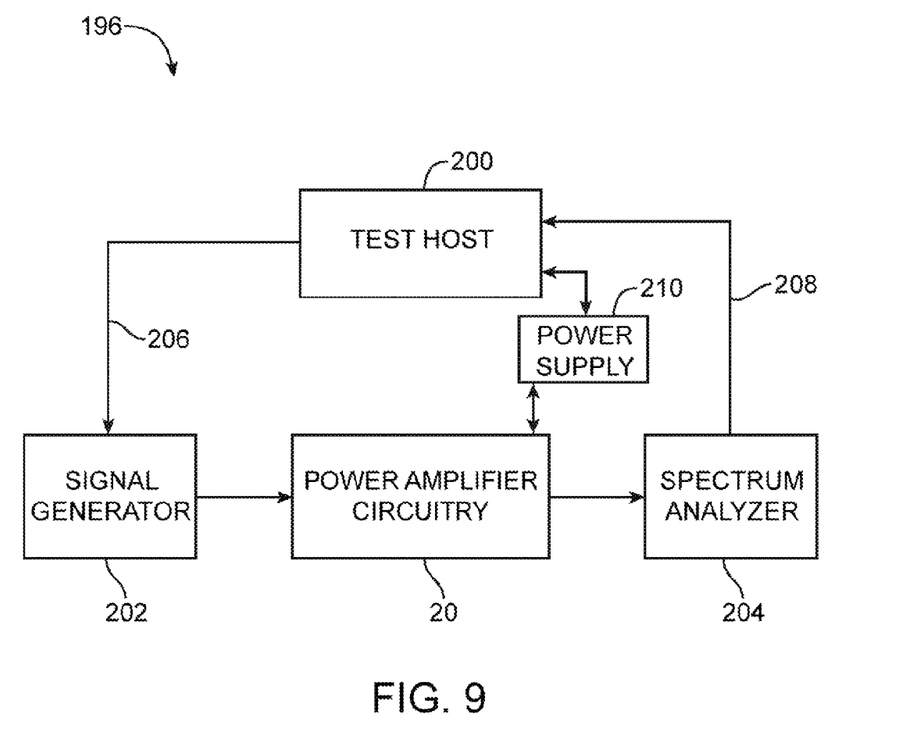
FIG. 9 is a diagram of an illustrative test station for testing power amplifier circuitry in accordance with an embodiment of the present invention.

FIG. 9 is a diagram of test station 196 that may be used to test power amplifier circuitry 20 in an unassembled state (e.g., test station 196 may be used to directly test the performance of circuitry 20 without connecting circuitry 20 to other the wireless communications circuitry such as transceiver circuit 14, baseband module 18, storage and processing circuitry 26, and antennas 34 that are described in connection with FIG. 1). As shown in FIG. 9, test station 196 may include a test host 200 (e.g., a personal computer), a radio-frequency signal generator 202, a tester such as a spectrum analyzer 204 (e.g., a vector network analyzer), and a power supply unit 210.

Test host 200 may direct signal generator 202 (e.g., by sending control signals via path 206) to generate desired radio-frequency output signals using only a desired portion of its available resource blocks 100 to an input of power amplifier circuit 20 so that the test signals generated at the output of power amplifier circuitry 20 during testing exhibits power profiles similar to those described in connection with FIGS. 7 and 8. Power amplifier circuitry 20 may receive the input test signals and may provide an amplified version at its output. During testing, power supply unit 210 may be used to supply current to powering circuitry 20.

Spectrum analyzer 204 may receive the output signals from power amplifier circuitry 20 and may be used to perform desired radio-frequency measurements (e.g., may be used to measure ACLR, error vector magnitude, power spectral density, signal-to-noise-ratio, etc.). Spectrum analyzer 204 may feed the gathered results to test host 200 via path 208. Test host 200 may then be used to determine whether or not power amplifier circuitry 20 meets design criteria. As an example, if the measured ACLR is less than a predetermined threshold, circuitry 20 under test may be marked as satisfactory. If the measured ACLR exceeds the predetermined threshold, circuitry 20 may be marked as failing.

If desired, power supply unit 210 may also be configured to provide different supply voltages to power amplifier circuitry 20 during testing. Sweeping the power supply voltages during test operations may provide information that can be used to further optimize the performance of power amplifier circuitry 20. For example, it may be desirably to determine the lowest acceptable power supply voltage that still enables power amplifier circuitry 20 to satisfy design criteria. Obtaining power supply settings in this way may help reduce power consumption.

Figure 10:
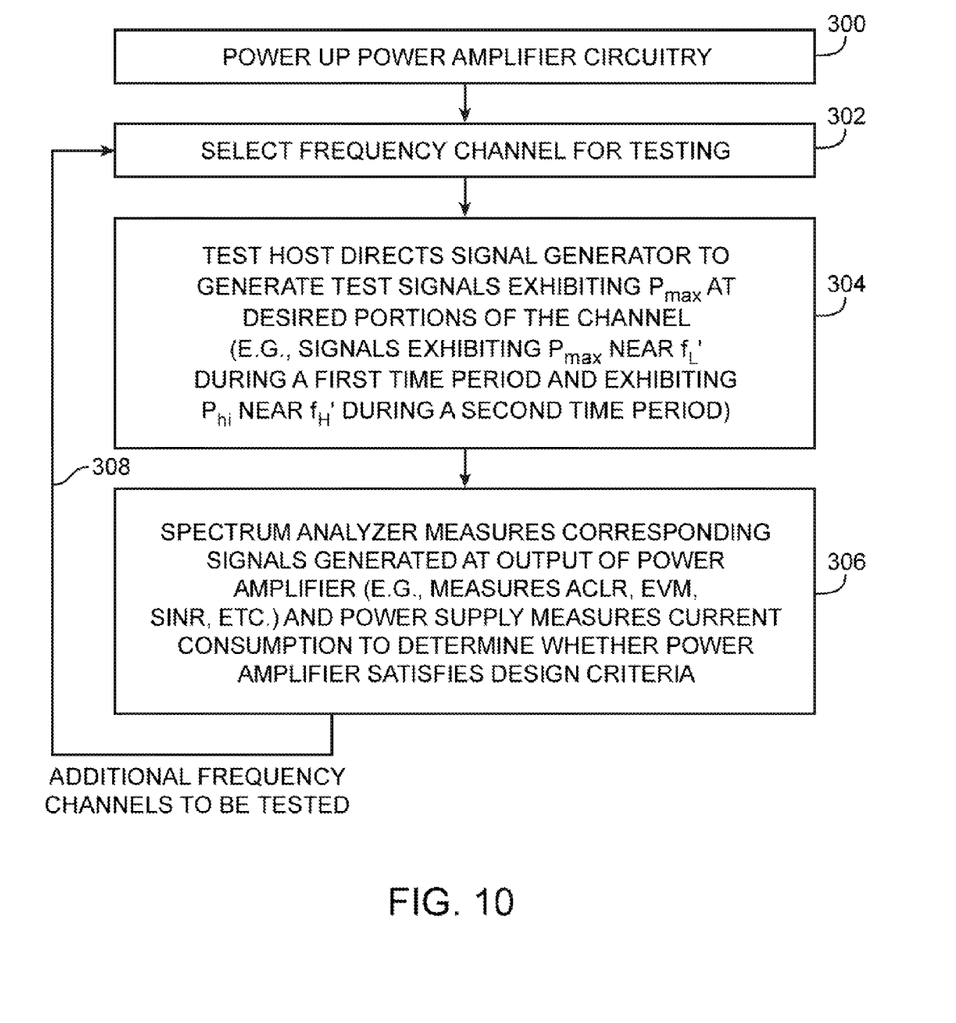
FIG. 10 is a flow chart of illustrative steps involved in operating the test station of FIG. 9 in accordance with an embodiment of the present invention.

FIG. 10 is a flow chart of illustrative steps involved in operating test station 196 to test power amplifier circuitry 20. At step 300, power amplifier circuitry 20 may be powered up by supplying circuitry 20 with power supply voltages. At step 302, test host 200 may select a frequency channel for testing.

At step 304, test host 200 may direct signal generator 202 to output test signals exhibiting maximum output power level in desired portions of the selected channel (e.g., test signals exhibiting Pmax near the lower edge of the maximum available bandwidth associated with the selected channel during a first time period and near the upper edge of the maximum available bandwidth associated with the selected channel during a second time period).

At step 306, spectrum analyzer 204 may be used to measure the signals generated at the output of power amplifier circuitry 20 during the first and second time periods (e.g., to measure ACLR, error vector magnitude, signal-to-interference ratio, or other radio-frequency performance metrics) and power supply 210 may be used to take current consumption measurements on the power amplifier circuitry 20 to determine whether power amplifier circuitry 20 satisfies design criteria. The current consumption measurements taken using power supply 210 and the radio-frequency measurements taken using spectrum analyzer 204 may be fed to test host 200. Processing may loop back to step 302 to test additional frequency channels, as indicated by path 308. If desired, test station 196 may be used to test any number of power amplifier circuitry 20 at desired frequencies using the exemplary steps of FIG. 10.

Power amplifier circuitry 20 may also be tested when it is assembled in a device under test (DUT) 10. DUT 10 may be tested using a conducted test station 197 FIG. 11 (e.g., a test station in which DUT 10 is directly wired to the test unit). Test station 197 may include test accessories, computers, network equipment, tester control boxes, cabling, test cells, and other test equipment for conveying radio-frequency test signals and gathering test results. Test station 197 may include test host 200, and test unit 210.

Figure 11:
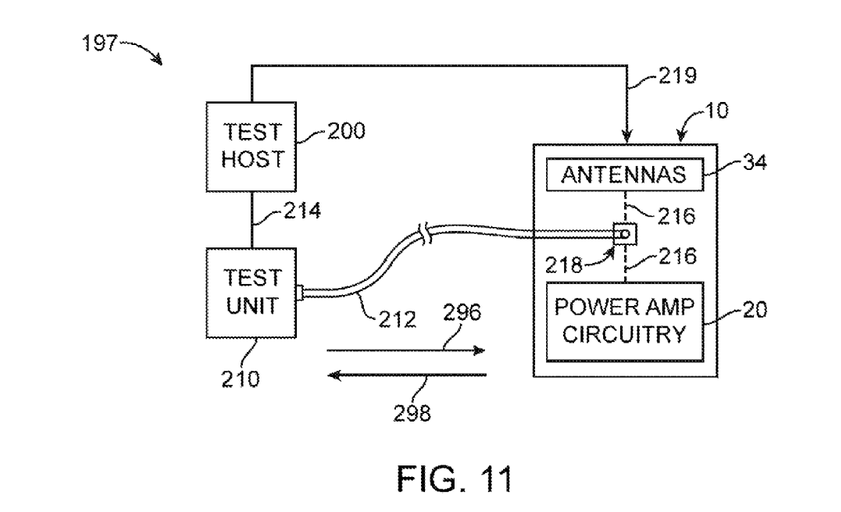
FIGS. 11 and 12 are illustrative test stations for testing a wireless device under test in accordance with an embodiment of the present invention.

Test unit 210 may be a signal generator, a spectrum analyzer, a vector network analyzer, and other testers suitable for generating radio-frequency test signals and for performing radio-frequency measurements on signals received from DUT 10. In other suitable arrangements, test unit 210 may be a radio communications tester of the type that is sometimes referred to as a call box or a base station emulator. Test unit 210 may, for example, be the CMU200 Universal Radio Communication Tester available from Rohde & Schwarz. Test unit 210 may be used to emulate the behavior of a base transceiver station to test the ability of transceiver 14 to support "2G" cellular telephone communications protocols such as the 2G GSM and 2G CDMA, 3G cellular telephone communications protocols such as UMTS and EV-DO, 4G cellular telephone communications protocols such as LTE, and other suitable cellular telephone communications protocols. If desired, test unit 210 may be configured to emulate the behavior of a network access point to test the ability of transceiver 14 to support the WiFi® communications protocol, the Bluetooth® communications protocol, or other communications standards.

Test unit 210 may be operated directly or via computer control (e.g., when test unit 210 receives commands from test host 200). When operated directly, a user may control test unit 210 by supplying commands directly to the signal generator using the user input interface of test unit 210. For example, a user may press buttons in a control panel on the signal generator while viewing information that is displayed on a display in test unit 210. In computer controlled configurations, test host 100 (e.g., software running autonomously or semi-autonomously on the computer) may communicate with test unit 210 by sending and receiving data over a wired path 214 or a wireless path between the computer and the signal generator (as an example).

DUT 10 may be coupled to test host 200 through wired path 219 (as an example). Connected in this way, test host 200 may send commands over bus 219 to configure DUT 10 to perform desired operations during testing. Test host 200 and DUT 10 may be connected using a Universal Serial Bus (USB) cable, a Universal Asynchronous Receiver/Transmitter (UART) cable, or other types of cabling (e.g., bus 219 may be a USB-based connection, a UART-based connection, or other types of connections).

DUT 10 may be coupled to test unit 210 though a radio-frequency cable such as radio-frequency test cable 212. DUT 10 may include a radio-frequency switch connector 218 interposed in a transmission line path 216 connecting power amplifier circuitry 20 to antenna structures 34. Test cable 212 may have a first terminal that is connected to a corresponding port in test unit 210 and a second terminal that can be connected to switch connector 218. When cable 212 is coupled to DUT 10 via switch connector 218, test unit 210 may be configured to perform power amplifier testing (e.g., radio-frequency test signals may be conveyed between test unit 210 and power amplifier circuitry 20). Cable 212 may include a miniature coaxial cable with a diameter of less than 2 mm (e.g., 0.81 mm, 1.13 mm, 1.32 mm, 1.37 mm, etc.), a standard coaxial cable with a diameter of about 2-5 mm, and/or other types of radio-frequency cabling.

Radio-frequency signals may be transmitted in a downlink direction (as indicated by arrow 296) from test unit 210 to DUT 10 through cable 212. During downlink signal transmission, test host 200 may direct test unit 210 to generate RF test signals at its input/output (I/O) port while DUT 10 receives corresponding test signals through switch connector 218. Radio-frequency signals may also be transmitted in an uplink direction (as indicated by arrow 298) from DUT 10 to test unit 210 through cable 212. During uplink signal transmission, DUT 10 may be configured to generate RF signals using power amplifier circuitry 20 while test unit 210 receives the corresponding test signals through its I/O port and may perform desired radio-frequency measurements on the received test signals.

Figure 12:
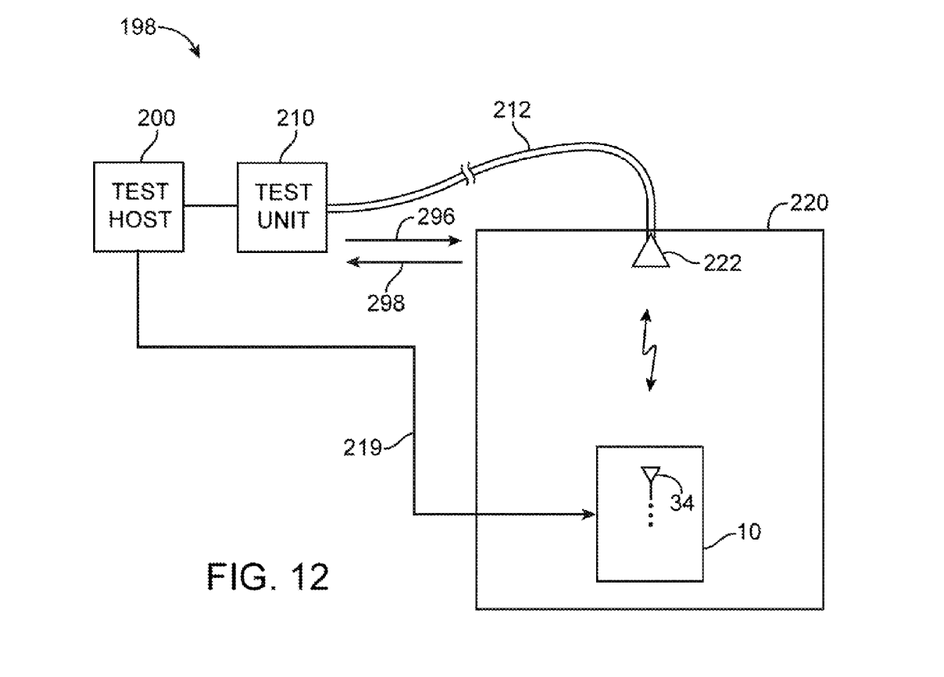

DUT 10 may also be tested using a radiated setup using an over-the-air test station 198, as shown in FIG. 12. Test station 198 may include test host 200, test unit 210, and a test enclosure such as test enclosure 220.

During testing, at least one DUT 10 may be placed within test enclosure 220. DUT 10 may be optionally coupled to test host 200 via control cable 219 (e.g., a USB-based connection or a UART-based connection).

Test enclosure 220 may be a shielded enclosure (e.g., a shielded test box) that can be used to provide radio-frequency isolation when performing electromagnetic compatibility (EMC) radiated tests without experiencing interference from outside environment. Test enclosure 220 may, for example, be a transverse electromagnetic (TEM) cell. The interior of test enclosure 220 may be lined with radio-frequency absorption material such as rubberized foam configured to minimize reflections of wireless signals. Test enclosure 220 may include in its interior wireless structures 222 for communicating over short distances using near field electromagnetic coupling (e.g., over ten centimeters or less). Wireless structures 222 in test enclosure 220 may include an inductor or other near field communications element (sometimes referred to as a near field communications test antenna or near field communications coupler) used to radiate corresponding near field electromagnetic signals to DUT 10. Test antenna 222 may be coupled to test unit 210 via a radio-frequency cable 212 (e.g., a coaxial cable). Test antenna 222 may be used during production test procedures to perform over-the-air testing on DUT 10 (e.g., so that radio-frequency test signals may be conveyed between test unit 210 and DUT 10 via antenna 222). Test antenna 222 may, as an example, be a microstrip antenna such as a microstrip patch antenna. If desired, DUT 10 in the conducted setup of FIG. 11 may also be placed in a test enclosure 220 during testing.

During testing, downlink test signals may be conveyed from test antenna 222 to DUT 10 in the direction of arrow 296, whereas uplink test signals may be conveyed from DUT 10 to test antenna 222 in the direction of arrow 298. Test radio-frequency signals may be conveyed between test unit 210 and DUT 10 over a non-protocol-compliant communications path (e.g., an unauthenticated wireless communications data link) or a protocol-compliant communications link (e.g., an authenticated wireless communications link).

Figure 13:
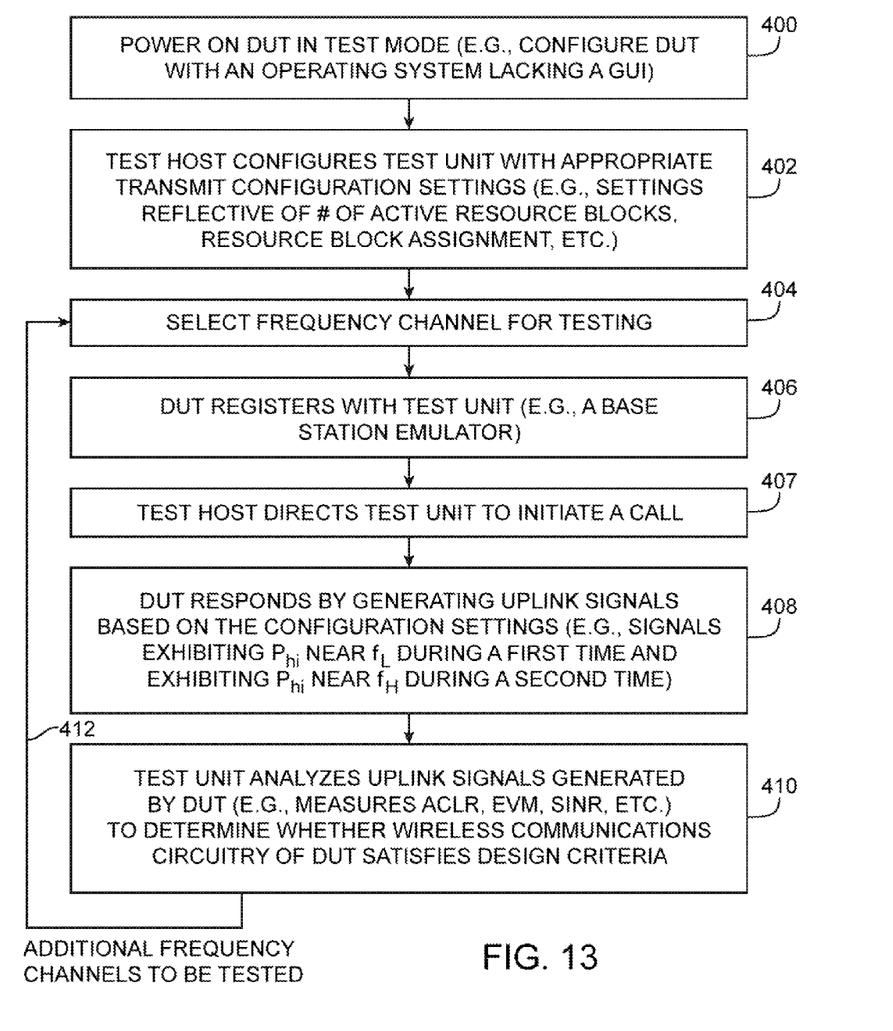
FIG. 13 is a flow chart of illustrative steps involve in operating a test station of the type shown in connection with FIGS. 11 and 12 in accordance with an embodiment of the present invention.

FIG. 13 is a flow chart of illustrative steps involved in operating conducted/radiated test stations of the type described in connection with FIGS. 11 and 12 to test the performance of power amplifier circuitry in an assembled DUT 10. At step 400, DUT 10 may be powered on in test mode (e.g., DUT 10 may be loaded with an operating system lacking a graphical user interface). At step 402, test host may configure test unit 210 to with appropriate transmit settings (e.g., settings that configure test unit 210 to operate according to the LTE protocol and to utilize a desired fraction of the available resource blocks, etc.). At step 404, test host 200 may select a frequency channel for testing.

At step 406, DUT 10 may register with test unit 210 (e.g., DUT 10 may notify test unit 210 of its presence). At step 407, test host 200 may direct test unit 210 to initiate a call by sending DUT 10 radio-frequency control signals using the appropriate transmission configuration settings (e.g., settings that configure DUT to operate according to the LTE protocol).

At step 408, DUT 10 may respond by generating uplink signals based on the configuration settings (e.g., by transmitting radio-frequency signals exhibiting maximum output power level near desired portions of the selected channel). For example, DUT 10 may be configured to generate test signals exhibiting Pmax near the lower edge of the maximum available bandwidth associated with the selected channel during a first time period and near the upper edge of the maximum available bandwidth associated with the selected channel during a second time period (e.g., DUT 10 is allocated a first lower portion of the available bandwidth during the first time period and is allocated a second higher portion of the available bandwidth during the second time period).

If desired, power supply circuitry 38 may also be configured to provide varying power supply levels (see, FIG. 1, storage and processing circuitry 16 may provide an analog control signal via path 40 to control the level of Vcc supplied over path 42 to power amplifier circuitry 20). For example, DUT 10 may transmit radio-frequency test signals according to a predetermined pattern of output power levels for each portion of the available bandwidth during the first and second time periods). Sweeping the power supply voltages in this way may provide information that can be used to further optimize the performance of power amplifier circuitry 20. In other words, DUT 10 may be configured to generate test signals exhibiting different output power levels from Pmax to a minimum output power level Pmin in the desired subset of resource blocks (e.g., the performance of DUT 10 may be tested across its entire dynamic range of Pmin to Pmax).

At step 410, test unit 210 may be used to measure the radio-frequency signals received from DUT 10 during the first and second time periods (e.g., to measure ACLR, error vector magnitude, signal-to-interference ratio, or other radio-frequency performance metrics) to determine whether power amplifier circuitry 20 in DUT 10 satisfies design criteria. Processing may loop back to step 404 to test additional frequency channels, as indicated by path 412. If desired, the conducted test arrangement of FIG. 11 and the radiated test arrangement of FIG. 12 may be used to test any number of DUTs 10 at desired frequencies using the exemplary steps of FIG. 13.

The foregoing is merely illustrative of the principles of this invention and various modifications can be made by those skilled in the art without departing from the scope and spirit of the invention. The foregoing embodiments may be implemented individually or in any combination.

What is claimed is:

1. A method for using a test station to test a device under test, wherein the test station includes a test unit, the method comprising:
   with the test unit, receiving radio-frequency test signals from the device under test that have been transmitted at a maximum output power level in a subset of resource blocks within an Orthogonal Frequency-Division Multiplexing (OFDM) radio-frequency channel, wherein the Orthogonal Frequency-Division Multiplexing radio-frequency channel is bounded by lower and upper edges and the subset of resource blocks are only positioned adjacent a selected one of the lower and upper edges of the Orthogonal Frequency-Division Multiplexing radio-frequency channel.

2. The method defined in claim 1 wherein the OFDM radio-frequency channel comprises a Long Term Evolution (LTE) channel.

3. The method defined in claim 1 further comprising:
   with the test unit, performing radio-frequency measurements on the received radio-frequency test signals, wherein the radio-frequency measurements comprise measurements selected from the group consisting of: adjacent channel leakage ratio, signal-to-noise ratio, signal-to-interference ratio, error vector magnitude, and power spectral density.

4. The method defined in claim 3 wherein the test station further includes a test host, the method further comprising:
   with the test host, determining whether the device under test satisfies design criteria by analyzing the radio-frequency measurements gathered using the test unit.

5. The method defined in claim 1 further comprising:
   placing the device under test in a shielded enclosure.

6. A method for using a test station to test wireless communications circuitry, wherein the test station includes a signal generator and a test unit, the method comprising:
   with the signal generator, providing radio-frequency test signals to the wireless communications circuitry for amplification; and
   with the test unit, receiving amplified radio-frequency test signals from the wireless communications circuitry that have been transmitted in a subset of resource blocks within a Long Term Evolution (LTE) radio-frequency channel while other resource blocks in the LTE radio-frequency channel are idle throughout testing, wherein the Long Term Evolution radio-frequency channel is bounded by lower and upper edges and the subset of resource blocks are only positioned adjacent a selected one of the lower and upper edges of the Long Term Evolution radio-frequency channel.

7. The method defined in claim 6 wherein the wireless communications circuitry comprises power amplifier circuitry and wherein providing radio-frequency test signals to the wireless communications circuitry comprises providing radio-frequency test signals to the power amplifier circuitry for amplification.

8. The method defined in claim 6 wherein the received radio-frequency test signals that have been transmitted in the subset of resource blocks comprise radio-frequency test signals transmitted at maximum output power from the wireless communications circuitry.

9. The method defined in claim 6 further comprising:
with the test unit, performing radio-frequency measurements on the received radio-frequency test signals, wherein the radio-frequency measurements comprise measurements selected from the group consisting of: adjacent channel leakage ratio, signal-to-noise ratio, signal-to-interference ratio, error vector magnitude, power spectral density, and current consumption.

10. The method defined in claim 6 wherein the received radio-frequency test signals that have been transmitted in the subset of resource blocks comprise radio-frequency test signals transmitted according to a predetermined pattern of output power levels.

11. A method for using a test station to test a device under test, wherein the test station includes a test unit, the method comprising:
with the test unit, receiving first radio- frequency signals from the device under test during a first time period, wherein the first radio-frequency signals are transmitted at a maximum output power level in a first subset of resource blocks within a Long Term Evolution (LTE) radio-frequency channel, wherein the LTE radio-frequency channel is bounded by lower and upper edges, and wherein the first subset of resource blocks are only positioned adjacent a selected one of the lower and upper edges of the LTE radio-frequency channel throughout testing.

12. The method defined in claim 11 further comprising:
with the test unit, receiving second radio-frequency signals from the device under test during a second time period that is different than the first time period, wherein the second radio-frequency signals are transmitted in a second subset of resource blocks within the radio-frequency channel, and wherein the second subset of resource blocks are positioned adjacent to one of the lower and upper edges other than the selected edge.

13. The method defined in claim 12 further comprising:
with the test unit, performing radio-frequency measurements on the first and second radio-frequency test signals, wherein the radio-frequency measurements comprise measurements selected from the group consisting of: adjacent channel leakage ratio, signal-to-noise ratio, signal-to-interference ratio, error vector magnitude, and power spectral density.

14. The method defined in claim 13 wherein the test station further includes a test host, the method further comprising:
with the test host, determining whether the device under test satisfies design criteria by analyzing the radio-frequency measurements gathered using the test unit.

15. The method defined in claim 12 wherein the first and second radio-frequency signals are modulated using an Orthogonal Frequency-Division Multiplexing (OFDM) modulation scheme.

\* \* \* \* \*